July 20, 1965   J. G. C. BOUDEWIJN   3,195,368
AUTOMATIC TRANSMISSION
Filed Aug. 16, 1962   3 Sheets-Sheet 2

3,195,368
AUTOMATIC TRANSMISSION
Jan G. C. Boudewijn, Eindhoven, Netherlands, assignor to Van Doorne's Automobielfabriek N.V., Eindhoven, Netherlands
Filed Aug. 16, 1962, Ser. No. 217,452
Claims priority, application Netherlands, Aug. 17, 1961, 268,312
8 Claims. (Cl. 74—472)

This invention relates to an automatic transmission for a motor vehicle of the kind described and illustrated in Patent No. 3,017,785, granted to Joan Van Der Brugghen et al., January 23, 1962.

The transmission system described in said patent is designed for a motor vehicle having a suction tube with a throttle valve therein, spring means normally urging said throttle valve to its closed position, a gas control member connected with said throttle valve to open it against spring means, said transmission comprising a shaft, an axially expandable belt pulley comprising a pulley half fixed to said shaft and a pulley half axially movable relative to said shaft, a driving belt cooperating with said pulley, a cylinder secured to said movable pulley half, a partition fixed to said shaft dividing said cylinder into two chambers, a change-over valve cooperating with said gas control member having communication with the atmosphere and with said suction tube, one of said chambers having communication either with said suction tube or with the atmosphere through said change-over valve, said change-over valve when said gas control member opens said throttle valve placing said chamber in communication with said suction tube and when said throttle valve moves to the closed position placing said chamber in communication with the atmosphere. If the throttle valve is in a position in which it differs from the nearly closed position, the vacuum prevailing in the suction tube is transmitted to said chamber, the axially displaceable pulley half is urged in such direction that the ratio of the transmission is changed to a ratio which may be compared with a high gear.

Although the gas control member may be of any kind, for the sake of simplicity it will be indicated herebelow as an accelerator since such a control member is usual in motor vehicles. This accelerator may be depressed against spring means or may be released in which latter case said spring means will return the accelerator to a position in which the throttle valve is nearly closed, the spring means acting on said throttle valve acting at the same time to move the accelerator.

If in the above patented construction the accelerator is released and the vacuum chamber connected with the movable pulley half is connected with the atmosphere, the belt on the driving pulley runs on a small effective diameter. This is favorable for the acceleration when starting the vehicle. If, however, the accelerator is depressed, the connection between the vacuum chamber and the atmosphere is interrupted, said vacuum chamber is connected with the suction tube in which an underpressure prevails, with the effect that the transmission is "changed up" (comparable with a higher gear). This under pressure decreases, however, according as the accelerator is further depressed, and it has appeared that at certain variations of the position of the accelerator (e.g. when moved from one-quarter-throttle to three-quarter-throttle) the ratio of the transmission reacts quicker to the decreased underpressure than would be desirable for a moderate acceleration. The transmission is namely quicker and more frequent changed down to a "lower gear" (greater reduction) than one would do in a motor vehicle provided with a gear wheel transmission for a moderate acceleration.

The object of the invention is to improve the patented construction, especially concerning the unfavorable or nervous reactions of the transmission that occur at movements of the accelerator between one-quarter-throttle to three-quarter-throttle, while the effect of rapidly changing down at full gas is retained in order to obtain a maximum acceleration which is a result of the low vacuum then prevailing in the suction tube.

A further object of the invention is to provide a transmission which permits a maximum acceleration by depressing the accelerator from any position to the full-throttle position.

According to the invention the improvement is achieved by the arrangement of a non-return valve and a buffer tank in the connection between said suction tube and said change-over valve, said non-return valve being placed in the connection between said buffer tank and said suction tube and opening in the direction of said suction tube, a movable member in the change-over valve being so connected with the gas control member that besides in the position of said gas control member in which said throttle valve is nearly closed, also in a position of the gas control member in which said throttle valve is nearly fully open, said chamber in said cylinder is connected with the atmosphere and in intermediate positions of the gas control member said chamber is connected with said suction tube via said buffer tank and via said change-over valve.

With the above and other objects in view reference is made to the detailed description of a preferred form of the invention shown in the drawings in which.

Figure 1:
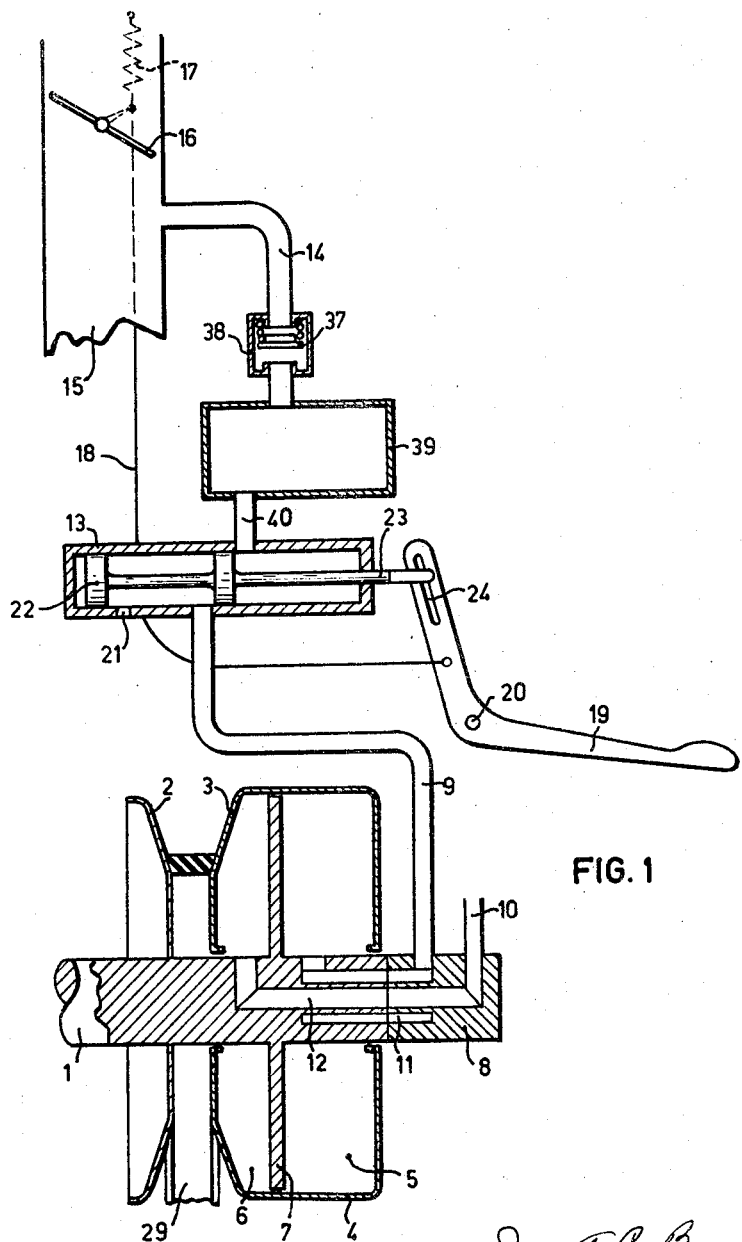
FIG. 1 is a diagrammatic view with parts in cross-section of the suction tube, the valve system and a pulley in the position in which the accelerator is released.

A shaft 1 carries an expandable belt pulley consisting of a pulley half 2 which is fixedly secured to said shaft and a pulley half 3 which is slidably mounted on said shaft. A cylinder 4 is fixedly secured to the pulley half 3 or may be integral therewith. Located within the cylinder is a partition 7 which divides the cylinder into two chambers 5 and 6. The partition may be fixedly secured to the shaft 1 or may be integral therewith. The cylinder 4 makes an air-tight connection with the partition 7.

The pressures prevailing in the chambers 5 and 6 will control the movement of the pulley half 3 towards and away from the pulley half 2. In addition springs and/or other centrifugal devices may be used for controlling the movement of the pulley half 3, but such devices have been omitted from the drawing and are shown for instance in Patent No. 3,017,783 above referred to which illustrates an expandable pulley comprising spring means, centrifugal means and a cylinder fixed to one pulley half and divided into two chambers.

Instead of the partition 7 the cylinder 4 may also be divided into two chambers by means of a diaphragm which is centrally secured to the shaft 1 and is at its periphery secured air-tight to the wall of the cylinder 4.

At the end of the shaft 1 there is provided a stationary nipple 8 making an air-tight connection therewith and such nipple is connected to conduits 9 and 10. Two concentric channels 11 and 12 are arranged in the shaft 1. The channel 11 is connected with the conduit 9 while the channel 12 is connected with the conduit 10.

A change-over valve 13 (corresponding with valve 13 of Patent No. 3,017,785) is connected to the conduit 9 and communicates with the chamber 5 and by a conduit 14 with the suction tube 15 of the engine in which the usual throttle valve 16 is located. The throttle valve 16 is controlled by a spring 17 which in turn is connected by a cable 18 to the accelerator 19 pivoted at 20.

The valve 13 is provided with an opening 21 which communicates with the atmosphere and within this valve 13 is a double piston 22 slidably arranged. The end of the piston rod 23 connected with said piston 22 engages a slot 24 in one arm of the accelerator 19. The spring 17 which urges the throttle valve 16 to the closed position, tends to turn the accelerator in an anti-clockwise direction so that by the connection 23, 24 the double piston 22 is urged to the left (according to the drawings).

The greater the vacuum in the suction tube 15, the greater is the vacuum in the chamber 5. The cylinder 4 and the pulley half 3 are therefore shifted upon the shaft 1 to approach the stationary pulley half 2, thereby narrowing the pulley.

Air can pass into the chamber 6 via the channel 14 and the conduit 10 which in this instance debouches freely into the atmosphere.

When the accelerator 19 is released and it rotates by the action of spring 17 about the pivot 20, the double piston 22 is urged to the left as shown in FIG. 1.

Thus far, the arrangement is practically the same as a portion of the control device described and shown in Patent No. 3,017,785.

According to the present invention a non-return valve 37 located in a valve housing 38 and a buffer tank 39 are arranged between the change-over valve 13 and the conduit 14, a tube 40 connecting the change-over valve 13 with the buffer tank 39. Said non-return valve 37 is loaded by a spring in a manner to open in the direction of the conduit 14.

The new device operates in the following way.

If the engine runs idle with practically closed throttle valve 16 and the accelerator 19 is released, so that the double piston 22 is in the position as shown in FIG. 1, the chamber 5 of the cylinder 4 communicates with the atmosphere through the channel 11, the conduit 9, the valve 13 and the opening 21. Then under the influence of the pull of the belt 29 which runs on the pulley 2, 3 and other members, if such are present, the pulley half 3 is displaced outwardly from the pulley half 2. The air present in the chamber 6 may escape through the channel 12 and the conduit 10. The pulley halves 2 and 3 being urged apart by the pull of the belt 29, the result is that the belt runs on a small effective diameter. The vacuum prevailing in the suction tube 15 lifts the non-return or one way valve 37 from its seat, and communicates with the buffer tank 39.

Figure 2:
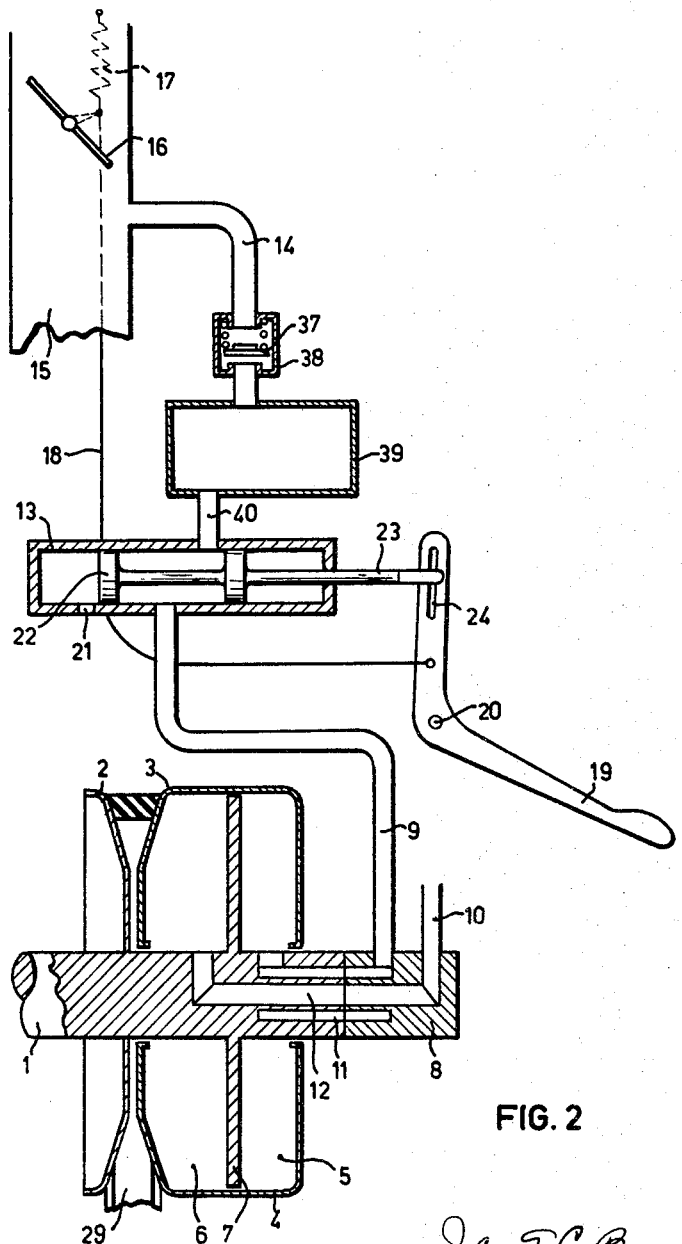
FIG. 2 is a similar view of the accelerator partially depressed.

If now the accelerator 19 is partially depressed in order to start the motor vehicle, as is shown in FIG. 2, the double piston 22 is displaced to the right, so that the chamber 5 is connected with the buffer tank via the channel 11, the conduit 9, the valve 13 and the tube 40. The vacuum prevailing in the buffer tank is transmitted to the chamber 5, so that the slidable pulley half 3 is urged in the direction of the non-displaceable pulley half 2. The double piston 22 interrupts by its displacement the communication between the opening 21 and the conduit 9 and thus from the chamber 5.

The throttle valve 16 decreases by its partial opening the vacuum in the suction tube 15, but in the buffer tank 39 a higher vacuum (which had been produced by the idle running engine) is maintained in the buffer tank 39 and thereby also in the chamber 5. The belt 29 is now running on a larger effective diameter than in case a non-return valve should be present, which is desirable for a non-maximum acceleration.

If the motor vehicle is driven at a constant speed, e.g. with half-throttle, and it is desired to accelerate, this is effected by farther depressing the accelerator. In the known device as described in Patent No. 3,017,785, the result would be that as well when moderately accelerating as when strongly accelerating, the vacuum in the chamber 5 decreases correspondingly to the decrease of the vacuum in the suction tube 15. In both cases the distance between the pulley halves 2 and 3 increases with the undesired result that the engine will run faster and will be less noiseless.

This drawback is waived by the fact that according to the invention the buffer tank 39 and the non-return valve 37 are arranged between the valve 13 and the suction tube 14. In this way a decrease of the vacuum in the suction tube is prevented from being communicated to the chamber 5 by the fact that the non-return valve 37 closes while the communication between the chamber 5 and the buffer tank 39 is maintained.

Figure 3:
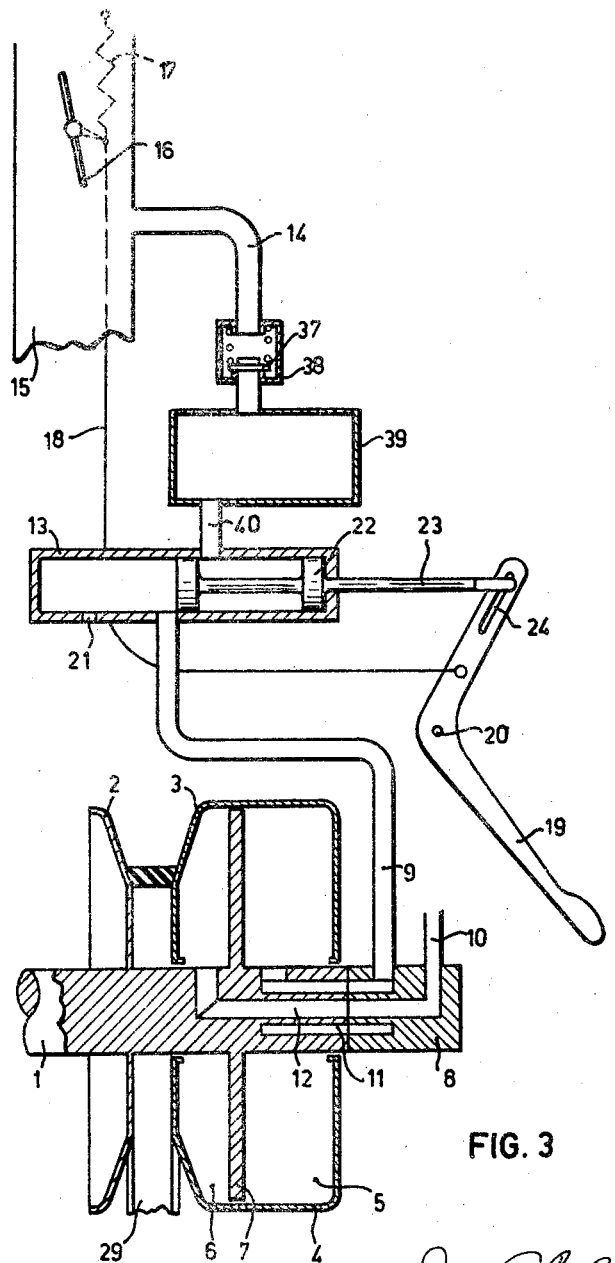
FIG. 3 is a similar view in which the accelerator is fully depressed.

If on the other hand it is desired to accelerate with full-throttle, the double piston 22 is displaced entirely to the right (FIG. 3) so that the connection between the chamber 5 and the buffer tank 39 is interrupted and at the same time the chamber is connected with the atmosphere via the channel 11, the conduit 9, the valve 13 and the opening 21. The belt will run now on a small diameter which is desired for a maximum acceleration with full-throttle.

Moderate movements of the accelerator between ¼-throttle and ¾-throttle such as are necessary for accelerations and decelerations which particularly will occur when driving in town traffic, have no more the result that the ratio of transmission is continuously subject to changing and accordingly the engine speed would be subject to strong variations. Apart from the possibility of a maximum acceleration with full-throttle, the invention gives the advantages that the engine will be more noiseless, while wear of the belt is decreased and fuel is saved.

It is remarked that the device described hereabove may be applied without any modification to a motor vehicle as described in Patent No. 3,017,785, on the understanding that in that case the conduit 10 does not freely debouch into the atmosphere, but is connected with a device which makes it possible to bring about, in special cases, a vacuum in the chamber 6 in order to use the engine as a brake when driving downhill or as an auxiliary brake to sustain the normal brake device of the vehicle.

What I claim is:

1. A transmission for a motor vehicle having a suction tube with a throttle valve therein, spring means normally urging said throttle valve to closed position, a gas control member connected with said throttle valve to open said throttle valve against said spring means, said transmission comprising a driven shaft, an axially expandable belt pulley comprising a pulley half fixed to said shaft and a pulley half axially movable relative to said shaft, a belt cooperating with said pulley, a cylinder secured to said movable pulley half, a partition fixed to said shaft dividing said cylinder into two chambers, a change-over valve cooperating with said gas control member having communication with the atmosphere and with said suction tube, one of said chambers having communication with said suction tube or with the atmosphere through said change-over valve, said change-over valve when said gas control member opens said throttle valve placing said chamber in communication with said suction tube and when said throttle valve moves to the closed position placing said chamber in communication with the atmosphere, the improvement consisting of a non-return valve and a buffer tank arranged in the connection between said suction tube and said change-over valve, said non-return valve being placed in the connection between said buffer tank and said suction tube and opening in the direction of said suction tube, a movable member in said change-over valve connected with said gas control member so that when said gas control member is in the position in which said throttle valve is nearly closed and also when in a position in which said throttle valve is nearly fully open, said chamber in said cylinder is connected with the atmosphere and when said gas control member is in intermediate positions said chamber is connected with said suction tube via said buffer tank and said change-over valve.

2. In a fluid pressure actuated expansible pulley transmission the combination comprising a suction tube having a throttle valve therein, spring means normally urging said valve to closed position, a gas control member connected with said throttle valve, a change over valve controlling the expansible pulley, a tubular connection between said suction tube and said change-over valve, and a non-return valve and a buffer tank located in said connection between said suction tube and said change over valve to eliminate extreme variations in acceleration and deceleration.

3. In a fluid pressure actuated expansible pulley transmission the combination comprising a suction tube having a throttle valve therein, spring means normally urging said valve to closed position, a gas control member connected with said throttle valve, a change over valve controlling the expansible pulley, a tubular connection between said suction tube and said change-over valve, and a non-return valve and a buffer tank located in said connection between said suction tube and said change over valve to eliminate extreme variations in acceleration and deceleration, and said gas control member having a sliding connection with said change over valve, to eliminate extreme variations in acceleration and deceleration.

4. A control device for a transmission having a stepless adjustable V-belt gear for motor vehicles provided with a motor with carburetor, comprising a change-over valve for adjusting the transmission ratio, a suction tube, a gas control member, said gas control member and the vacuum in said suction tube determining the position of said change-over valve, said change-over valve connecting the control device of said V-belt gear either with the atmosphere or with said suction tube, a connection between said change-over valve and said suction tube, and a buffer tank and a non-return valve arranged in said connection.

5. A control device according to claim 4 for a V-belt gear with an axially expandable belt pulley having a shaft, a cylinder, a throttle valve in said suction tube, said belt pulley having an axially movable pulley half connected with said cylinder, a partition fixed to the shaft of said pulley dividing said cylinder into two chambers, at least one of said chambers by means of said change-over valve being connected with said gas control member, is connected either with said suction tube or with the atmosphere, and in which the vacuum prevailing in said chamber shifts the axially movable pulley half in a direction in which the reduction ratio of the transmission is increased, said non-return valve opens in the direction of said suction tube and said change-over valve connects, by means of a displaceable member arranged therein, said chamber with the atmosphere, not only in the position of said gas control member in which said throttle valve is nearly closed, but also in the position in which said throttle valve is almost fully open, while said member in intermediate positions of said gas control member is connected with said buffer tank.

6. A control device comprising a gradually variable transmission in which a belt pulley has an axially movable pulley half, a V-belt cooperating with said belt pulley, said axially movable pulley half being fixedly connected with a cylinder in which a partition fixed to a shaft of said pulley confines a chamber of variable volume, which chamber by means of a change-over valve that is controlled by a gas control member, is connected with the atmosphere in the position of said gas control member in which said throttle valve is nearly closed, and in a position of said gas control member deviating from said first position, has communication with said suction tube, thus lowering the pressure in said chamber and moving the axially movable pulley half in the direction effecting "changing up" the transmission, characterized in that in a connection between said suction tube and said change-over valve a non-return valve opening in the direction of said suction tube, and a buffer tank are arranged, said change-over valve being so executed and being so connected with the gas control member, so that besides in the position of said gas control member in which said throttle valve is nearly closed, also in the position of the gas control member in which said throttle valve is almost fully open, said chamber of said cylinder is connected with the atmosphere, and in intermediate positions of said gas control member said chamber is connected with said buffer tank via said change-over valve.

7. A transmission for a motor vehicle having a suction tube with a spring-loaded throttle valve therein, a gas control member connected with said throttle valve to open the same against spring means, said transmission comprising a driven shaft, an axially expandable belt pulley having a pulley half fixed to said shaft and a pulley half movable relative to said shaft, a belt for being driven by said pulley, a cylinder secured to said movable pulley half, a partition fixed to said shaft confining a vacuum chamber within said cylinder, a change-over valve comprising a cylindrical housing with a slidable double piston therein operatively connected with said gas control member, a first, a second and a third opening in said cylindrical housing, said first opening connecting the space within said cylindrical housing with the atmosphere, said second opening adapted to connect said space with said vacuum chamber by means of said conduit and one or more channels within said shaft, said third opening adapted to be connected with said suction tube via a buffer tank and a non-return valve opening in the direction of said suction tube, the arrangement of the change-over valve being such: that if said gas control member is released, said second opening, and thereby said vacuum chamber, is connected with the atmosphere through a space confined by said double piston and said first opening, while the connection between said third opening and said first and second openings is interrupted by said double piston; that in the fully depressed position of said control member the connection between said third opening and said first and second openings is also interrupted by said double piston; and if said gas control member is partly depressed, thus being in intermediate positions, said second and third openings communicate via said space, thus communicating said vacuum chamber with said suction tube through said buffer tank and said non-return valve.

8. In a fluid pressure actuated expansible pulley transmission having a suction throttle, means controlling the expansible pulley and connections therebetween the combination of a non-return valve and buffer means located in the connection between said throttle and said means controlling the expansible pulley to provide smoother acceleration and deceleration.

References Cited by the Examiner

UNITED STATES PATENTS 2,094,449  9/37  Forichon _____ 74—336.5 X
3,017,785  1/62  Brugghen et al.

DON A. WHITE, *Primary Examiner.*